Aug. 26, 1958 — R. C. DREIER — 2,849,039
SAW CONSTRUCTION
Filed Feb. 13, 1957
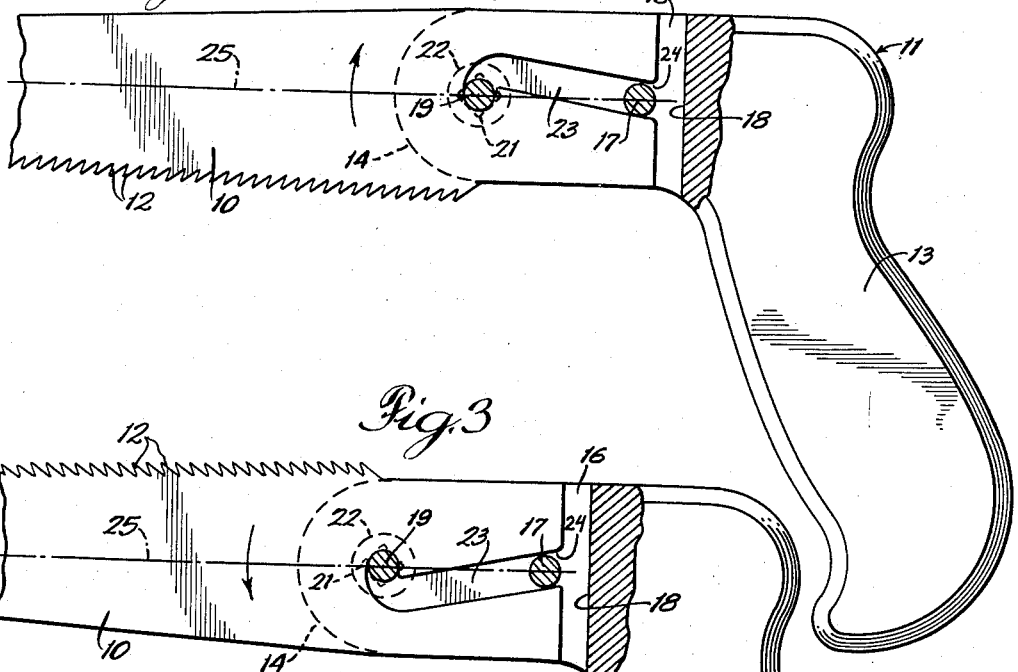
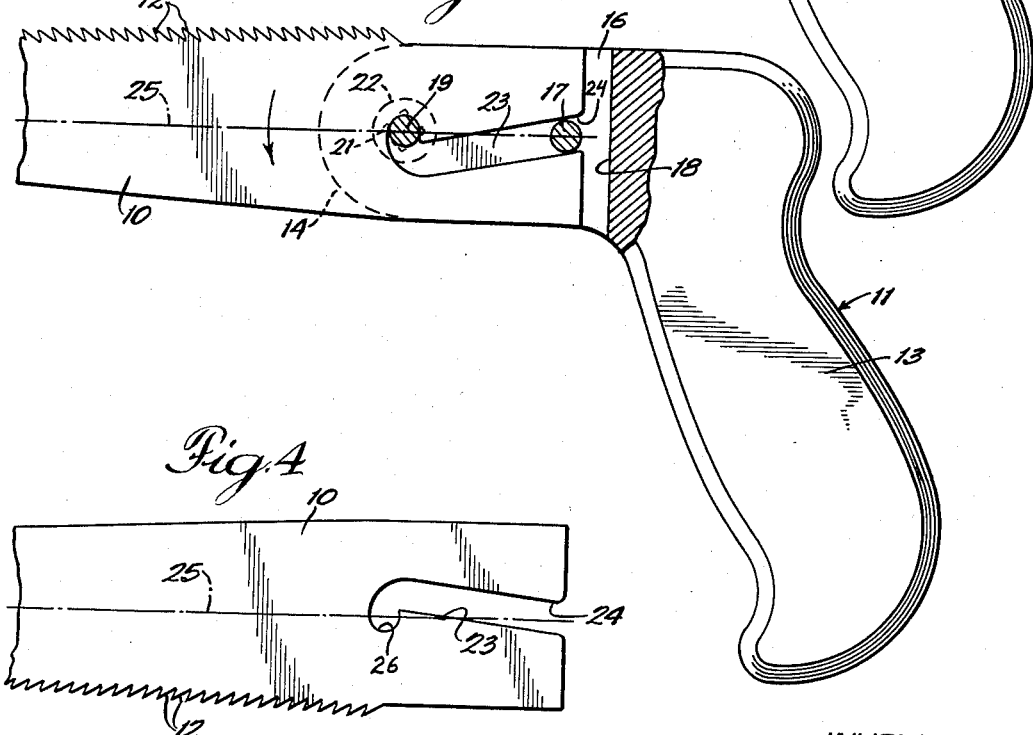
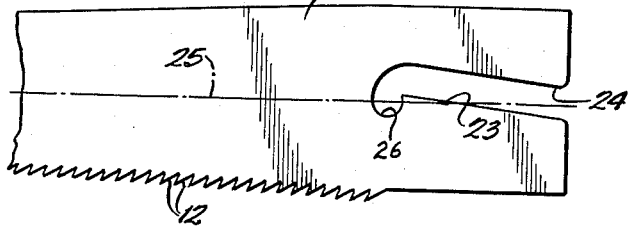
INVENTOR:
Raymond C. Dreier,
BY Smith, Olsen, Baird & Miller
ATTORNEYS.

United States Patent Office

2,849,039
Patented Aug. 26, 1958

2,849,039

SAW CONSTRUCTION

Raymond C. Dreier, Chicago, Ill., assignor to Dreier Brothers, Inc., Chicago, Ill., a corporation of Illinois Application February 13, 1957, Serial No. 639,869

1 Claim. (Cl. 145—31)

This invention relates to saw structures, and more particularly to a saw blade handle mount for releasably anchoring a saw blade in a handle therefor. The invention is especially useful with hand saws such as the compass or keyhole saw, wherein the saw blade is affixed at only one end thereof to a handle. It is also applicable, however, to saws having a handle affixed to each end of the blade.

The keyhole or compass saw customarily has an elongated blade equipped at one end with a handle and tapers therefrom toward a point to enable at least the narrow end portion of the blade to be inserted into a rather small opening for initiating a cutting operation. Frequently, the saws are used on walls or panels that are vertically disposed, and for that reason it is desirable to have the blade removably secured to the handle and invertible with respect thereto in order to selectively orient the teeth thereof upwardly when an upwardly directed line of severance is to be made. With a blade that can be inverted, the handle always may be gripped in an ordinary manner and, therefore, the saw manipulated with ease irrespective of whether the sawing operation performs upwardly or downwardly directed cuts.

Another instance that requires a removable handle mount for saw blades is the universal saw kit now being sold in large numbers to the home workman. Such kits ordinarily provide a single handle and a plurality of individual saw blades which may be selectively mounted in the handle. Each blade, of course, is designed to perform a particular cutting operation. Compass saws and saw kits are both available wherein the blades thereof are releasably mounted in a handle, but for the most part the mounting arrangements are not wholly satisfactory for they either require considerable time and often tools to change or invert a saw blade, or if of a simplified character they do not sufficiently constrain the saw blade against movement with respect to the handle in longitudinal directions or rotatably with respect thereto. The blade tends to resist or lag movement of the handle along the longitudinal axis of the blade because of the frictional resistance to movement exerted on the blade during the sawing operation. The blade tends to rotate with respect to the handle during a sawing operation because of the workman's force pressing the blade, through the handle, against the material being cut in a direction generally normal to the longitudinal axis of the blade.

There exists a need in the art for an improved mount for a saw blade in the handle therefor that affords quick and ready removal and replacement of a saw blade, but one which securely anchors the blade in the handle so as to resist all relative movement therebetween. The provision of such an improved mount is one of the objects of this invention. Another object of the invention is that of providing a means for mounting a blade in the handle of compass saws and the like, and which permits the blade to be quickly and easily removed from the handle and remounted therein in inverted position, and which functions to rigidly constrain the saw blade in the handle against movement in all directions with respect thereto in either of the inverted positions of the blade.

A further object of the invention is in the provision of a saw structure having an invertible blade, and that utilizes for the mounting of the blade in the handle a pair of spaced apart pins carried by the handle and a slot provided by the blade, the pins and slot being arranged and interrelated so that the longitudinal axis of the blade passes through the center of the pins when the blade is mounted in the handle both when the teeth of the blade are oriented upwardly and downwardly, whereby no torque resulting from eccentricity of the mounting means tends to rotate the blade relative to the handle— the spaced pins being operative to prevent rotation of the blade during use of the saw. Yet a further object is that of providing a structure of the character described in which the slot in the blade is angularly oriented with respect to the longitudinal axis thereof, but terminates at its inner end in a socket or seat aligned with that axis and adapted to receive a pin therein, such pin snugly engaging the blade to prevent movement of the blade relative to the handle along the longitudinal axis of the blade. Additional objects and advantages of the invention will become apparent as the specification develops.

An embodiment of the invention is illustrated in the accompanying drawing, in which—

Figure 1 is a broken top plan view of a saw structure embodying the invention;

Figure 2 is a broken side view in elevation in which certain of the parts are shown in section, illustrating the blade mounted in the handle with the teeth of the blade oriented downwardly;

Figure 3 is a broken side view in elevation in which certain of the parts are shown in section, and is similar to that of Figure 2 except that it shows the blade mounted in the handle with the teeth of the blade oriented upwardly; and Figure 4 is a broken side view in elevation of the saw blade, showing the end thereof which is mountable within the handle.

The saw structure illustrated in the drawing comprises a saw blade 10 removably and invertibly mountable within a handle 11. The blade 10 is equipped with teeth 12 along one longitudinal edge thereof, and the blade shown tapers in a direction away from the handle 11 and terminates in a narrow end. Thus, the blade is able to initiate a sawing operation by starting the cut within a small opening, and the structure may therefore be termed a compass or keyhole saw. The handle 11 is equipped with a grip 13 contoured so as to be readily grasped within the fingers of a workman's hand. Extending laterally or forwardly of the grip 13 is a bifurcated section providing spaced walls 14 and 15 defining a slot or channel 16 therebetween.

Extending transversely through the spaced walls 14 and 15 in intersecting relation with the channel 16 is an inner pin 17 spaced slightly from the terminus 18 of the channel 16. The pin 17 is secured in the walls 14 and 15 by any suitable means and, for example, may be pressed thereinto since in the form of the invention shown, the handle 11 is metal. Forwardly of the pin 17, and adjacent the outer ends of the walls 14 and 15, is a passage extending therethrough adapted to receive the shank or pin of a bolt 19 therein, threaded so as to receive a wing nut 20 thereon. The outer end of the passage in the wall 14 is enlarged and is square-shaped, and is dimensioned so as to receive the square-shaped shoulder 21 of the bolt therein which terminates in an enlarged head 22. Thus, cooperation between the square-shaped shoulder 21 and corresponding seat in the passage prevents rotation of the bolt when the wing nut 20 is tightened and loosened thereon.

The saw blade 10 is adapted at one end to be slidably received within the slot 16, and in width that end of the blade corresponds to the vertical dimension of the walls 14 and 15, as shown most clearly in Figures 2 and 3. The blade at that end has a channel or slot 23 formed therein that extends generally along the longitudinal axis of the blade, but is angularly oriented with respect thereto. The channel at the inner end thereof which is designated with the numeral 24, has its center disposed on the longitudinal axis of the blade, and for identification the axis is denoted with the numeral 25. As the channel extends forwardly therefrom, it diverges from the axis of the blade in a direction away from the teeth 12, and at its inner end it terminates in a socket or seat 26 offset from its own axis but aligned with the axis of the blade. The socket is arcuate and along the side thereof closest to the teeth 12 is semi-circular, defining an arc of approximately 180°. The center of that arc is positioned on the longitudinal axis 25 of the blade.

In mounting the blade 10 in the handle 11, the wing nut 20 is loosened so that the blade end can be passed easily through the handle slot 16. The blade is moved toward the outer end of that slot and inserted thereinto. Then, the blade is moved generally along its longitudinal axis to insert the outer pin (that is, the shank of the bolt 19) into the blade channel 23. Continued movement of the blade in the same direction slides the pin 19 through the blade channel, and advances the end 24 of that channel toward the inner pin 17. When the inner pin enters the channel, the blade begins to rotate slightly about the axis defined by the inner pin 17 so as to seat the outer pin or bolt shank in the socket 26. This then results in the configuration illustrated in either Figure 2 or 3.

If the blade is mounted with the teeth 12 thereof disposed downwardly as shown in Figure 2, the rotative movement of the blade in seating the pin 19 in the socket is in a clockwise direction as shown by the arrow in that figure, and the inner pin 17 is the axis for such rotation. On the other hand, if the blade is inverted—that is, being mounted with the teeth disposed upwardly as shown in Figure 3—the direction of the rotative movement of the blade about the axis of the pin 17 is in a counterclockwise direction as shown by the arrow in Figure 3. When so positioned, the wing nut 20 is tightened to bring the walls 14 and 15 of the handle into abutting, frictional engagement with the planar faces of the saw blade. Removal of the blade is accomplished by reversing the procedure.

By referring to Figures 2 and 3 it will be seen that the shank or pin provided by the bolt 19 is snugly received within the semi-circular portion of the socket 26 so that the pin rigidly constrains movement of the blade 10 with respect thereto in directions along the longitudinal axis 25 of the blade. Frictional resistance to movement of the blade 10 during a sawing operation, which results primarily from engagement of the teeth 12 of the blade with the material being severed, is thus absorbed by the bolt 19 to overcome any tendency of the blade to be moved longitudinally in the handle during the sawing operation. During the forward stroke of the saw the front side of the socket 26 bears forcefully against the shank of the bolt 19 and transmits to the bolt the forces that might otherwise tend to cause the blade to be driven rearwardly into the handle. On the other hand, during the retraction of the saw after a sawing stroke, frictional forces between the saw and the work-piece (which would tend to cause the blade to be withdrawn from the slot 16 of the handle), are absorbed by the back side of the bolt 19 which is engaged by the rear side of the socket 26. The forward and rear sides of the socket 26 thus provide two walls which bear upon the bolt 19 in such a way that, during the sawing operation, longitudinal movement of the blade with respect to the handle is absolutely prevented, the blade in effect being locked in its longitudinal position by the presence of the shank of the bolt 19 in the socket 26.

In spite of the ease with which the blade may be inserted into the handle and may be removed therefrom, it will also be observed that the shank of the bolt 19 and the pin 17 cooperate to prevent pivotal movement of the blade with respect to the handle during the sawing operation, regardless of whether the blade is positioned as shown in Fig. 2 or in Fig. 3. In either case, the forces that would tend to cause the blade to pivot about the bolt 19 are absorbed by the pin 17 which is snugly received within the open end portion 24 of the channel 23. When the blade is positioned with its teeth on its underside, as shown in Fig. 2, the hand pressure exerted by the operator during sawing causes pivotal forces to be applied to the blade in the direction of the arrow shown in that figure, but these forces are absorbed by the upper side of the pin 17 due to the fact that the upper side of the channel 23 will bear against it. Conversely, when the blade is mounted as shown in Fig. 3, the pivotal forces will be absorbed by the underside of the pin 17.

Thus, the cooperation between the bolt 19 and the pin 17, both of which are received in the channel 23, is such as to lock the blade in place in the handle and to prevent all movement of the blade with respect to the handle during the sawing operation.

While in the foregoing specification an embodiment of the invention has been described in considerable detail for purposes of illustration, it will be apparent that those skilled in the art may make numerous changes in those details without departing from the spirit and principles of the invention.

I claim:

In a saw structure having a removable blade, a saw blade equipped with teeth along a longitudinal edge thereof, said blade being provided at one end thereof with a single channel having an open end substantially centered on the longitudinal axis of said blade, said channel extending from the open end thereof in a diverging relationship with respect to the axis of said blade and terminating at its inner end in an offset socket centered on the axis of the blade and having abutment walls substantially normal to the axis of the blade and spaced from each other along said axis, a handle having a slot therein for receiving the channel-equipped end of said blade, and a pair of spaced apart pins mounted in said handle and extending transversely across said slot, said pins being slidable within said channel, one of said pins being snugly received in said socket and between said abutment walls to prevent longitudinal movement of said blade with respect to said handle when the blade is mounted within the handle and the other pin being snugly received in the open end portion of the channel.

References Cited in the file of this patent

UNITED STATES PATENTS

| | | |
|---|---|---|
| 298,115 | Peace | May 6, 1884 |
| 885,521 | Remington | Apr. 21, 1908 |
| 2,606,584 | Derr | Aug. 12, 1952 |

FOREIGN PATENTS

| | | |
|---|---|---|
| 807,399 | France | Oct. 12, 1936 |